United States Patent
Osada (10) Patent No.: US 8,705,100 B2
(45) Date of Patent: Apr. 22, 2014

(54) IMAGE PROCESSING APPARATUS THAT DISPLAYS SCREEN ON DISPLAY UNIT USING BROWSER, CONTROL METHOD THEREFOR, AND STORAGE MEDIUM

(75) Inventor: Mamoru Osada, Kawasaki (JP)

(73) Assignee: Canon Kabushiki Kaisha (JP)

( * ) Notice: Subject to any disclaimer, the term of this patent is extended or adjusted under 35 U.S.C. 154(b) by 147 days.

(21) Appl. No.: 13/234,214

(22) Filed: Sep. 16, 2011

(65) Prior Publication Data

US 2012/0069382 A1    Mar. 22, 2012

(30) Foreign Application Priority Data

Sep. 22, 2010   (JP) ................. 2010-212380

(51) Int. Cl.
*G06F 3/12* (2006.01)
*G06F 3/048* (2013.01)

(52) U.S. Cl.
USPC ......... 358/1.15; 358/1.14; 358/1.13; 715/777

(58) Field of Classification Search
USPC ........ 358/1.13–1.18; 715/777, 808, 809, 760, 715/234
See application file for complete search history.

(56) References Cited

U.S. PATENT DOCUMENTS

| | | | | |
|---|---|---|---|---|
| 5,559,946 A | * | 9/1996 | Porter | 715/781 |
| 6,587,861 B2 | * | 7/2003 | Wakai et al. | 715/209 |
| 6,631,407 B1 | * | 10/2003 | Mukaiyama et al. | 709/223 |
| 7,707,505 B1 | * | 4/2010 | Ohrt et al. | 715/738 |
| 7,855,792 B2 | * | 12/2010 | Nonaka | 358/1.13 |
| 2005/0157330 A1 | * | 7/2005 | Giuliano | 358/1.15 |
| 2005/0257130 A1 | * | 11/2005 | Ito | 715/500.1 |
| 2006/0095861 A1 | * | 5/2006 | Shikata | 715/777 |
| 2010/0037305 A1 | * | 2/2010 | Griffith et al. | 726/7 |

FOREIGN PATENT DOCUMENTS

JP      2007042098 A      2/2007

* cited by examiner

*Primary Examiner* — Dennis Dicker
(74) *Attorney, Agent, or Firm* — Rossi, Kimms & McDowell LLP (57) ABSTRACT

An image processing apparatus that is capable of, even in a case where browser screens are forcefully changed when the image processing apparatus changes in status during operation by a user, continuing operation through a screen displayed until just before the change of the browser screens when the image processing apparatus is restored. The status of the image processing apparatus is detected, and a screen is created according to the detected status of the image processing apparatus. The screen is displayed as a new tab when the image processing apparatus changes in status.

7 Claims, 9 Drawing Sheets

| COMMAND NAME | NEW TAB CREATION FLAG | SCREEN TRANSITION DISABLE FLAG | NUMBER OF EVENTS | PRIORITY LEVEL | RESOURCE IDENTIFIER (URL) |
|---|---|---|---|---|---|
| AddError | True | True | 1 | 1 | http://WebServer103/MFP101/Printer/PaperJam/PositionId=8 |
| 501 | 502 | 503 | 504 | 505 | 506 |

| | DETECTED STATUS | RESOURCE IDENTIFIER |
|---|---|---|
| 600 | | |
| 601 | Printer/NoPaper/Tray=1 | http://WebServer103/MFP101/Printer/NoPaper/Tray=1  ~602 |
| | ... | ... |
| 603 | Printer/PaperJam/Positon=8 | http://WebServer103/MFP101/Printer/PaperJam/Positon=8  ~604 |
| | ... | ... |
| 605 | Scanner/FeederJam/Positon=1 | http://WebServer103/MFP101/Scanner/FeederJam/Positon=1  ~606 |
| | ... | ... |

| COMMAND NAME | NUMBER OF EVENTS | PRIORITY LEVEL |
|---|---|---|
| ReviseError | 1 | 1 |

IMAGE PROCESSING APPARATUS THAT DISPLAYS SCREEN ON DISPLAY UNIT USING BROWSER, CONTROL METHOD THEREFOR, AND STORAGE MEDIUM

BACKGROUND OF THE INVENTION

1. Field of the Invention

The present invention relates to an image processing apparatus that displays a screen, which is provided by a server, on a display unit using a browser, a control method for the image processing apparatus, and a computer-readable storage medium storing a control program.

2. Description of the Related Art

In an information processing apparatus such as a personal computer, an operation screen provided by a server connected to the information processing apparatus via a network is displayed on a display unit via a browser of the information processing apparatus. Specifically, the browser of the information processing apparatus requests an operation screen from the server, and in response to the request from the information processing apparatus, an application on the server sends the information processing apparatus an HTML file for displaying the operation screen on the display unit. The browser of the information processing apparatus analyzes the received HTML file, and displays on the display unit the operation screen based on descriptions of the HTML file. When a user inputs an instruction via the operation screen displayed on the display unit, the browser notifies the server of the input instruction. Upon receiving the notification, the application on the server carries out processing according to the input instruction.

Some image processing apparatuses such as an MFP (multi-functional peripheral) having a scanner and a printer have a browser described above. The MFP displays an operation screen, which is provided by a server, on a display unit according to the procedure described above to receive various instructions from a user.

As an exemplary image processing apparatus having a browser, there has been proposed an image processing apparatus in which an internal application receives a display request including a resource identifier from an external device, and transfers the received resource identifier to a browser, which in turn displays contents on a display unit (Japanese Laid-Open Patent Publication (Kokai) No. 2007-42098). According to this proposal, when the image processing apparatus changes in status, a remote application is notified of this change in status, and the remote application issues a display request to the internal application of the image processing apparatus, so that an error is displayed on the display unit.

According to Japanese Laid-Open Patent Publication (Kokai) No. 2007-42098, however, when a display request is issued while a user is operating the image processing apparatus, operation screens of the display unit are forcefully changed, and hence the user has no choice but to suspend operation. Also, when the image processing apparatus recovers from an error, it is necessary to obtain screen information from a server again, and thus there is the problem that the user cannot go back to a screen on which operation was in progress. Under such circumstances, even with a "Return" operation on an ordinary browser, the user cannot go back to an immediately preceding state unless a screen that was displayed by the user is cached, and thus the user has to start operation all over again.

SUMMARY OF THE INVENTION

The present invention provides an image processing apparatus that is capable of, even in a case where browser screens are forcefully changed when the image processing apparatus changes in status during operation by a user, continuing operation through a browser screen displayed until just before the change of the browser screens when the image processing apparatus is restored, a control method for the image processing apparatus, and a computer-readable storage medium storing a control program.

Accordingly, a first aspect of the present invention provides an image processing apparatus that displays a screen, which is provided by a server, on a display unit using a browser, comprising a detection unit configured to detect a status of the image processing apparatus, a creation unit configured to create a screen according to the status detected by the detection unit, and a display control unit configured to, when the image processing apparatus changes in status, display the screen created by the creation unit as a new tab.

Accordingly, a second aspect of the present invention provides a control method for an image processing apparatus that displays a screen, which is provided by a server, on a display unit using a browser, comprising a detection step of detecting a status of the image processing apparatus, a creation step of creating a screen according to the status detected in the detection step, and a display control step of, when the image processing apparatus changes in status, displaying the screen created in the creation step as a new tab.

Accordingly, a third aspect of the present invention provides a computer-readable non-transitory storage medium storing a control program for implementing a control method for an image processing apparatus that displays a screen, which is provided by a server, on a display unit using a browser, the method comprising a detection step of detecting a status of the image processing apparatus, a creation step of creating a screen according to the status detected in the detection step, and a display control step of, when the image processing apparatus changes in status, displaying the screen created in the creation step as a new tab.

According to the present invention, even in a case where browser screens are forcefully changed when the image processing apparatus changes in status during operation by a user, operation can be continued through a screen displayed until just before the change of the browser screens when the image processing apparatus is restored.

Further features of the present invention will become apparent from the following description of exemplary embodiments (with reference to the attached drawings).

DESCRIPTION OF THE EMBODIMENTS

The present invention will now be described in detail with reference to the drawings showing an embodiment thereof.

Figure 1:
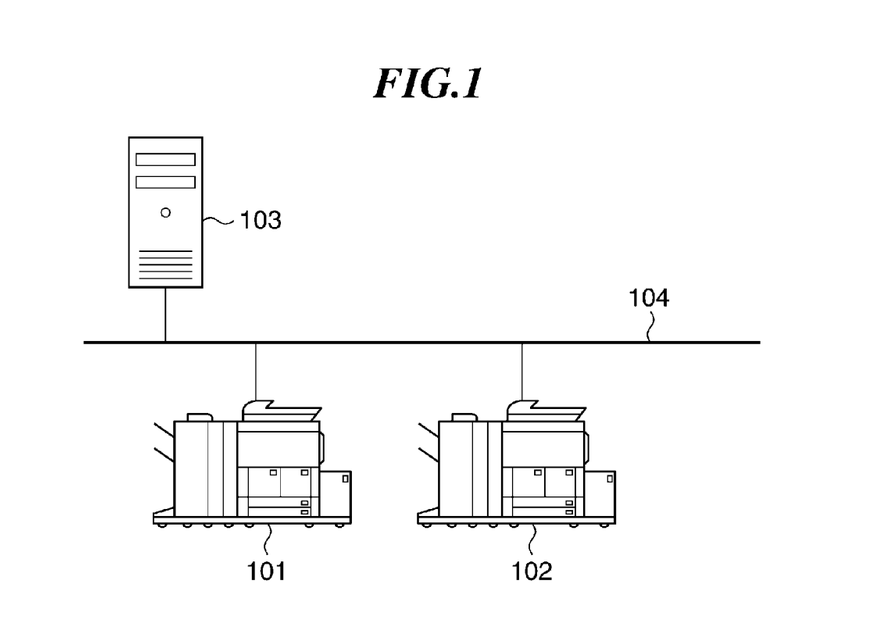
FIG. 1 is a diagram schematically showing an exemplary arrangement of a system including an MFP which is an exemplary image processing apparatus according to the present invention.

FIG. 1 is a diagram schematically showing an exemplary arrangement of a system including MFPs which are exemplary image processing apparatuses according to the present invention.

Referring to FIG. 1, MFPs 101 and 102 are connected to a server 103 for communication therewith via a network 104 such as a LAN. The MFPs 101 and 102 request screen information, which should be displayed on operation screens of the MFPs 101 and 102, from the server 103, and a Web server generates the requested screen information.

Figure 2:
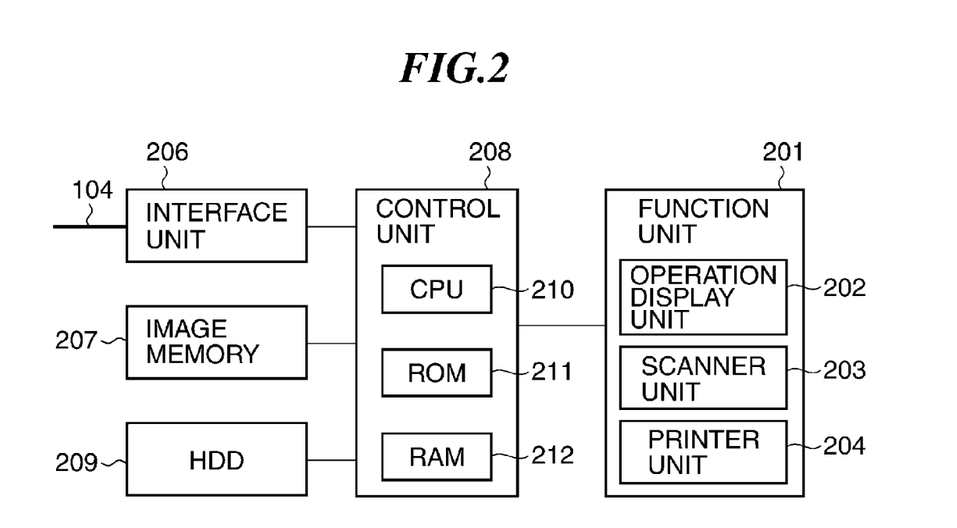
FIG. 2 is a block diagram schematically showing an exemplary arrangement of the MFP.

FIG. 2 is a block diagram schematically showing an exemplary arrangement of the MFPs 101 and 102. It should be noted that the MFPs 101 and 102 are identical in basic arrangement, and therefore, only the MFP 101 will be described.

Referring to FIG. 2, a control unit 208 includes a CPU 210, a ROM 211, and a RAM 212, and controls the overall operation of the MFP 101. The CPU 210 reads out control programs stored in the ROM 211 to carry out various control processes such as reading control and transmission control. The RAM 212 is used as temporary storage areas such as a main memory and a work area for the CPU 210. The control unit 208 is connected to a function unit 201, and controls the operation of an operation display unit 202, a scanner unit 203, and a printer unit 204.

A display unit such as a liquid crystal display having a touch panel function, a keyboard, and so on are placed on the operation display unit 202. The operation display unit 202 has a browser function, and a browser analyzes an HTML file received from the server 103, and displays an operation screen based on descriptions of the analyzed HTML file on the operation display unit 202.

The printer unit 204 prints, on a sheet, image data output from the control unit 208. The scanner unit 203 reads an image off an original to generate image data, and outputs the image data to the control unit 208. An interface unit 206 connects the control unit 208 to the network 104, and receives print image data and screen data, which is to be displayed on the operation display unit 202, from an external information processing apparatus (not shown). An HDD 209 stores image data and various programs. It should be noted that print image data received from the external information processing apparatus is temporarily stored in an image memory 207, and printed by the printer unit 204 via the control unit 208.

Figure 3:
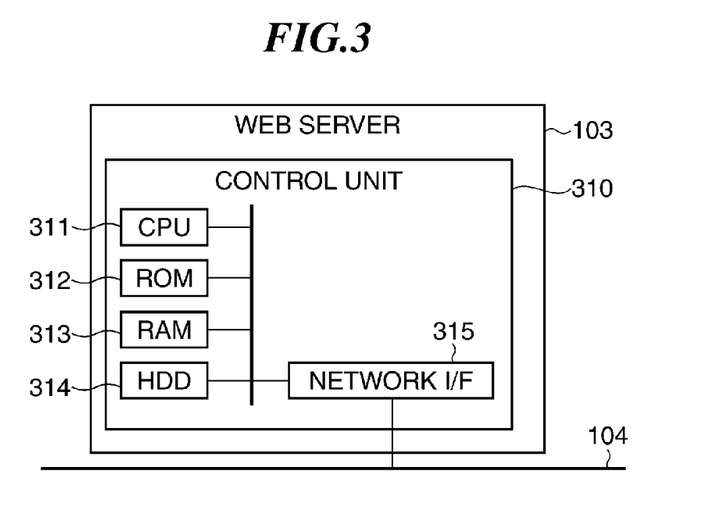
FIG. 3 is a block diagram schematically showing an exemplary arrangement of a server.

FIG. 3 is a block diagram schematically showing an exemplary arrangement of the server 103.

Referring to FIG. 3, a control unit 310 has a CPU 311, a ROM 312, a RAM 313, an HDD 314, and a network I/F 315, and controls the overall operation of the server 103. The CPU 311 reads out control programs stored in the ROM 312 to carry out various control processes. The RAM 313 is used as temporary storage areas such as a main memory and a work area for the CPU 311. The HDD 314 stores image data and various programs. The network I/F 315 connects the control unit 310 to the network 104.

Figure 4:
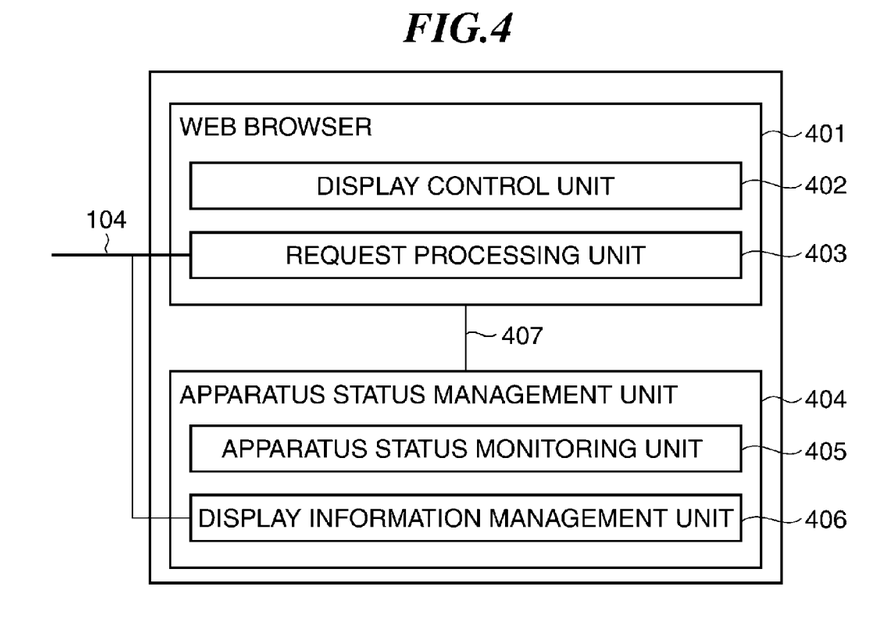
FIG. 4 is a block diagram schematically showing an exemplary software arrangement of the MFP.

FIG. 4 is a block diagram schematically showing an exemplary software arrangement of the MFP 101. Functions of software appearing in FIG. 4 are realized by the CPU 210 executing control programs stored in the ROM 211 and the HDD 209 of the MFP 101 and loaded into the RAM 212.

Referring to FIG. 4, the MFP 101 has a browser 401 and an apparatus status management unit 404. The browser 401 has a display control unit 402 and a request processing unit 403, and the apparatus status management unit 404 has an apparatus status monitoring unit 405 and a display information management unit 406.

The request processing unit 403 requests screen information, which is to be displayed on the operation display unit 202 according to HTTP protocol, from the server 103 via the network 104. Specifically, the request processing unit 403 requests information on an operation screen of the MFP 101, which is to be displayed on the operation display unit 202, from the server 103, and notifies the server 103 of an instruction from a user input via an operation screen displayed on the operation display unit 202. The request processing unit 403 also analyzes an HTML file received from the server 103. The HTML file includes descriptions that represent contents of an operation screen that should be displayed on the operation display unit 202. The display control unit 402 provides control to display an operation screen on the operation display unit 202 based on the result of analysis by the request processing unit 403.

On the other hand, the apparatus status monitoring unit 405 monitors the statuses of the scanner unit 203 and the printer unit 204, and detects changes in the status of the MFP 101 (in the present embodiment, error status) and recoveries of the MFP 101 (in the present embodiment, error recovery). According to the statuses detected by the apparatus status monitoring unit 405, the display information management unit 406 manages URLs as resource identifiers that identify screens which should be displayed on the operation display unit 202 by the browser 401. In the present embodiment, URLs managed by the display information management unit 406 are resources managed by the server 103.

It should be noted that URLs managed by the display information management unit 406 may be other servers connected to the network 104, or when the MFP 101 has a server function, resources managed within the MFP 101 may be designated. Moreover, information managed by the display information management unit 406 and resource identifiers that identify screens which should be displayed on the operation display unit 202 can be edited via the network 104.

The apparatus status management unit 404 and the browser 401 send and receive commands via a predetermined I/F 407.

Figure 5:
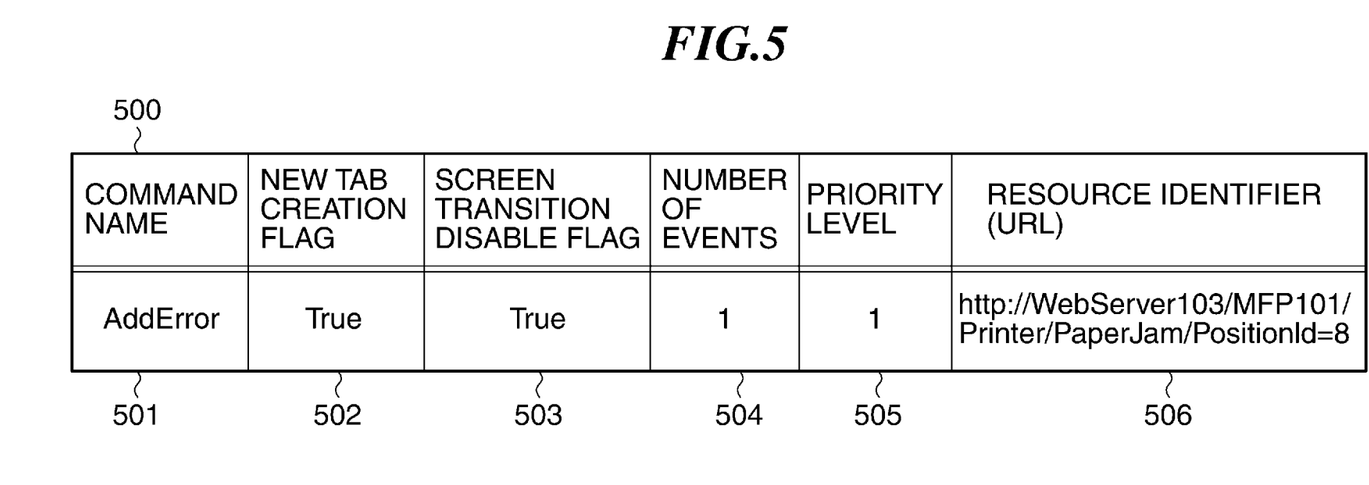
FIG. 5 is a diagram schematically showing an exemplary error occurrence notification command sent from an apparatus status management unit to a browser via an I/F.

FIG. 5 is a diagram schematically showing an exemplary error occurrence notification command sent from the apparatus status management unit 404 to the browser 401 via the I/F 407.

Referring to FIG. 5, a command 500 includes a command name 501, a new tab creation Flag 502, a screen transition disable Flag 503, the number of events 504, a priority level 505, and a resource identifier 506. It should be noted that the command in FIG. 5 may be provided as an API, or realized by network communication that loops back within the apparatus.

The command name 501 is information that uniquely identifies a command itself, and in the present embodiment, a command name that indicates the occurrence of an error is stored. It should be noted that when the command 500 is realized by API, a command name is in the same in meaning to an API name.

The new tab creation Flag 502 is Flag information that instructs display of a resource identifier indicated by the command using a new tab. When the new tab creation Flag 502 is True, this means an instruction to display the resource identifier using a new tab, and when the new tab creation Flag 502 is False, this means an instruction to display the resource identifier without using a new tab.

The screen transition disable Flag 503 is a Flag that instructs disablement of transition from a tab displayed by this command to another tab screen. When the screen transition disable Flag 503 is True, this means an instruction to disable transition to another tab screen, and when the screen transition disable Flag 503 is False, this means an instruction to enable transition to another tab screen.

The number of events 504 is an information field indicative of the number of events designated by this command, and when a plurality of events are occurring at the same time, a value greater than 1 is set. When this information field is indicative of a value greater than 1, there are the same number of fields of the priority level 505 and the resource identifier 506 as the number of events.

The priority level 505 is an information field indicative of a priority level of a screen with the resource identifier designated by this command. In the present embodiment, the priority level 505 is also used to control the order in which screens are displayed, and hence their numbers are expressed by natural numbers without overlapping, and it is assumed that a number of 1 represents the highest priority level.

The resource identifier 506 is resource identifier information, that is, a URL that designates a screen which should be displayed according to a priority level.

Figure 6:
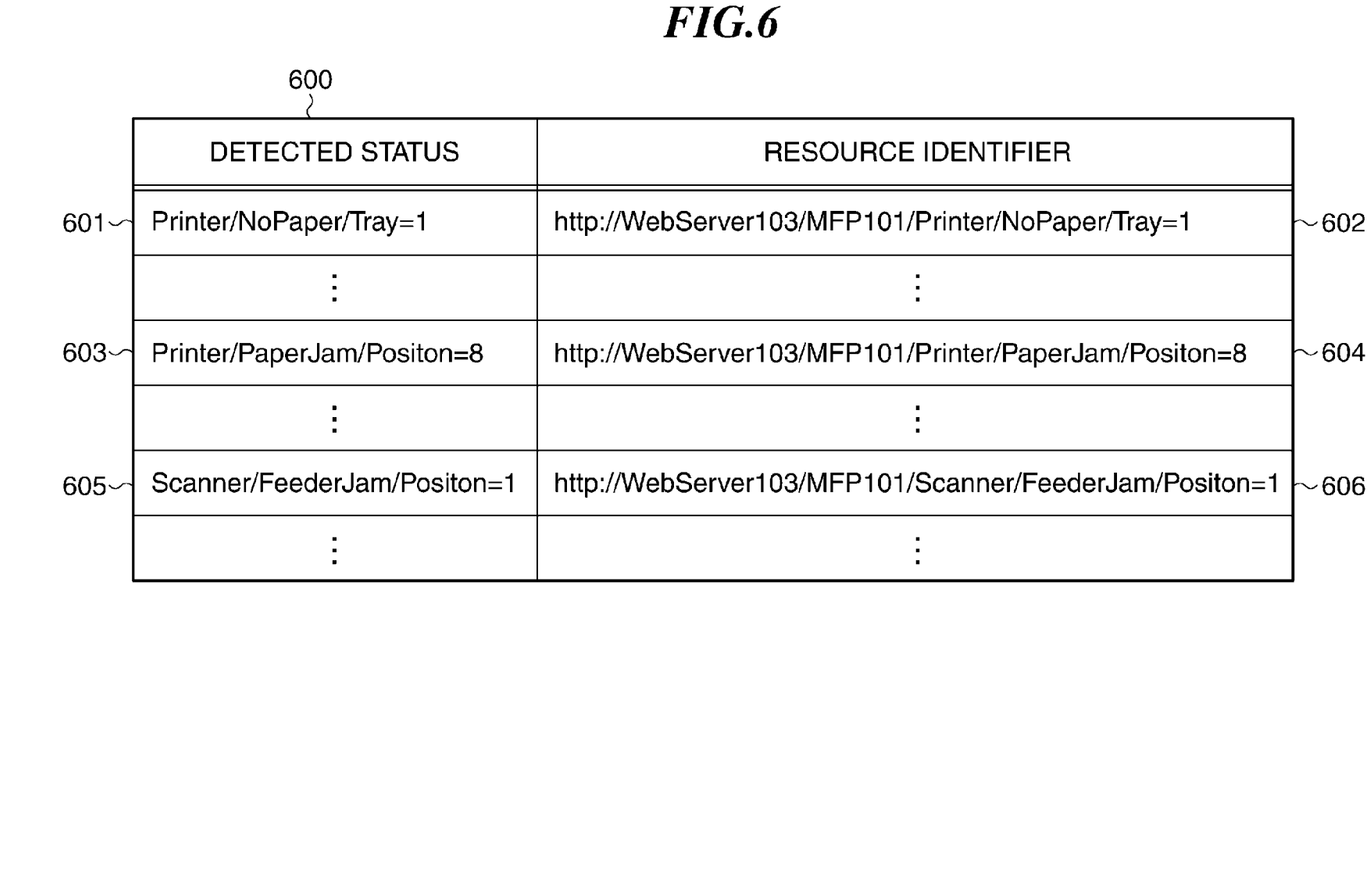
FIG. 6 is a diagram schematically showing exemplary data managed by a display information management unit.

FIG. 6 is a diagram showing exemplary data 600 managed by the display information management unit 406.

Referring to FIG. 6, detected statuses (error statuses) 601, 603, and 605 indicate the absence of sheets on a sheet feed tray 1 of the printer unit 204, a sheet jam at a sensor number 8 of the printer unit 204, and a sheet jam at a sensor number 1 of the scanner unit 203, respectively. Resource identifiers 602, 604, and 606 are resource identifiers indicative of screens corresponding to the detected statuses 601, 603, and 605, respectively.

Figure 7:
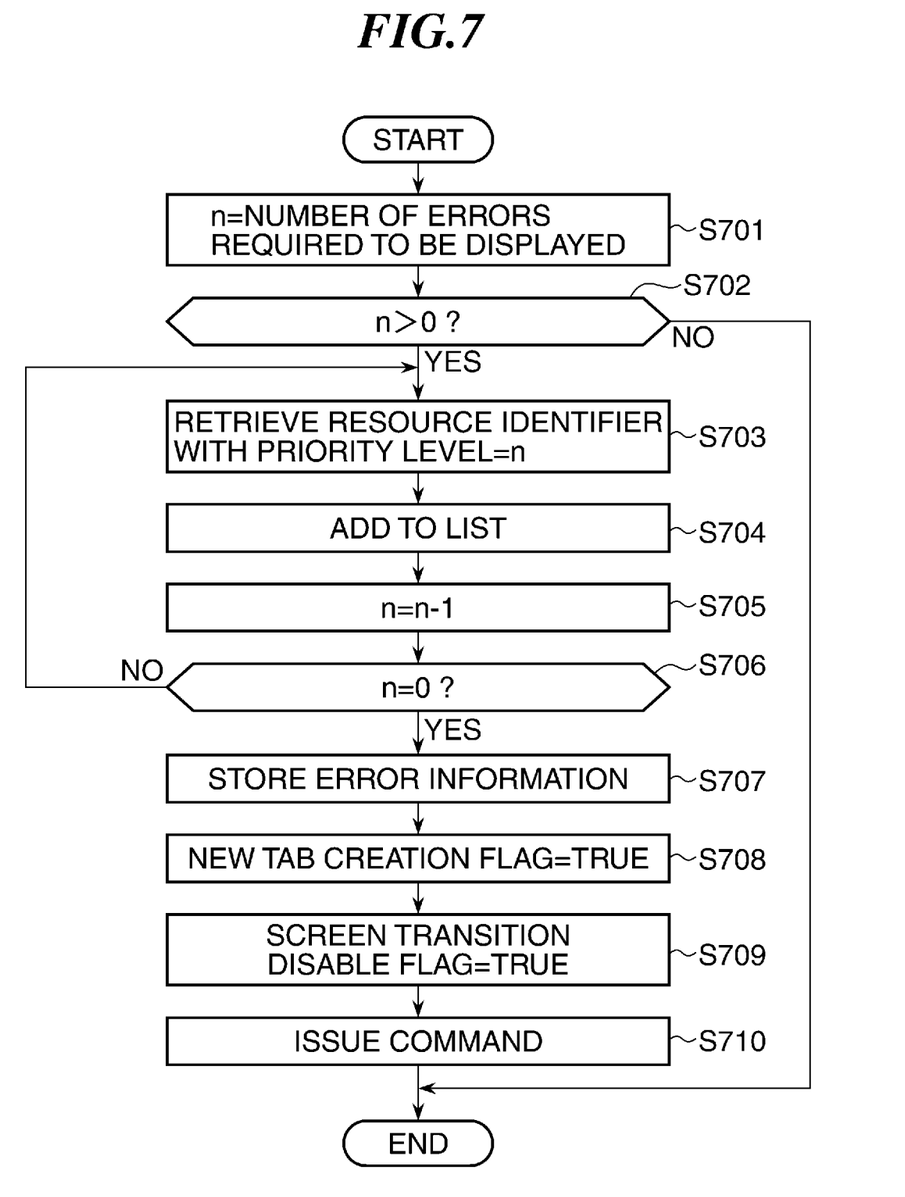
FIG. 7 is a flowchart useful in explaining an exemplary operation carried out when an apparatus status monitoring unit of the apparatus status management unit detects an error status of the MFP.

FIG. 7 is a flowchart useful in explaining an exemplary operation carried out when the apparatus status monitoring unit 405 of the apparatus status management unit 404 detects an error status of the MFP 101. Processes in FIG. 7 are carried out by the CPU 210 executing control programs stored in the ROM 211 and the HDD 209 of the MFP 101 and loaded into the RAM 212. It should be noted that a unit that detects an error status of the MFP 101 is not particularly limited, but may be a detection unit that detects an event or a means for obtaining the status of the MFP 101 on a regular basis.

In step S701, the CPU 210 counts the number of error statuses which should be displayed on the operation display unit 202, stores the counted number as a variable n in the priory level 505, and proceeds to step S702.

In the step S702, the CPU 210 determines whether or not the variable n is greater than 0, that is, whether or not there is an error status that should be displayed on the operation display unit 202. When yes, the CPU 210 proceeds to step S703, and when no, the CPU 210 terminates the process.

In the step S703, the CPU 210 determines an error of the nth priority level that should be displayed on the operation display unit 202, reads out a resource identifier corresponding to the error status from the data 600 managed by the display information management unit 406, and proceeds to step S704.

In the step S704, the CPU 210 stores, in the RAM 212 or the HDD 209, the resource identifier of the nth priority level determined in the step S703 as list information that should be sent to the browser 401 according to the command 500, and proceeds to step S705.

In the step S705, the CPU 210 decrements n (n=n−1) so as to retrieve the next priority level, and proceeds to step S706.

In the step S706, the CPU 210 determines whether or not n=0, that is, whether or not handling of all the errors has been completed, and when no, the CPU 210 returns to the step S703, and when yes, the CPU 210 proceeds to step S707.

In the step S707, the CPU 210 determines the error status that should be displayed on the operation display unit 202, the priority level determined in the step S703, and the resource identifier, and stores them in association with each other in a format, not shown, in the RAM 212 or the HDD 209, and proceeds to step S708.

In the step S708, the CPU 210 sets True as the new tab creation Flag 502 in the command 500, and proceeds to step S709.

In the step S709, the CPU 210 sets True as the screen transition disable Flag 503 in the command 500, and proceeds to step S710.

In the step S710, the CPU 210 transmits the flags set in the steps S708 and S709 and the list information created in the step S704 as the command 500 from the apparatus status management unit 404 to the browser 401 via the I/F 407, and terminates the process.

Figure 8:
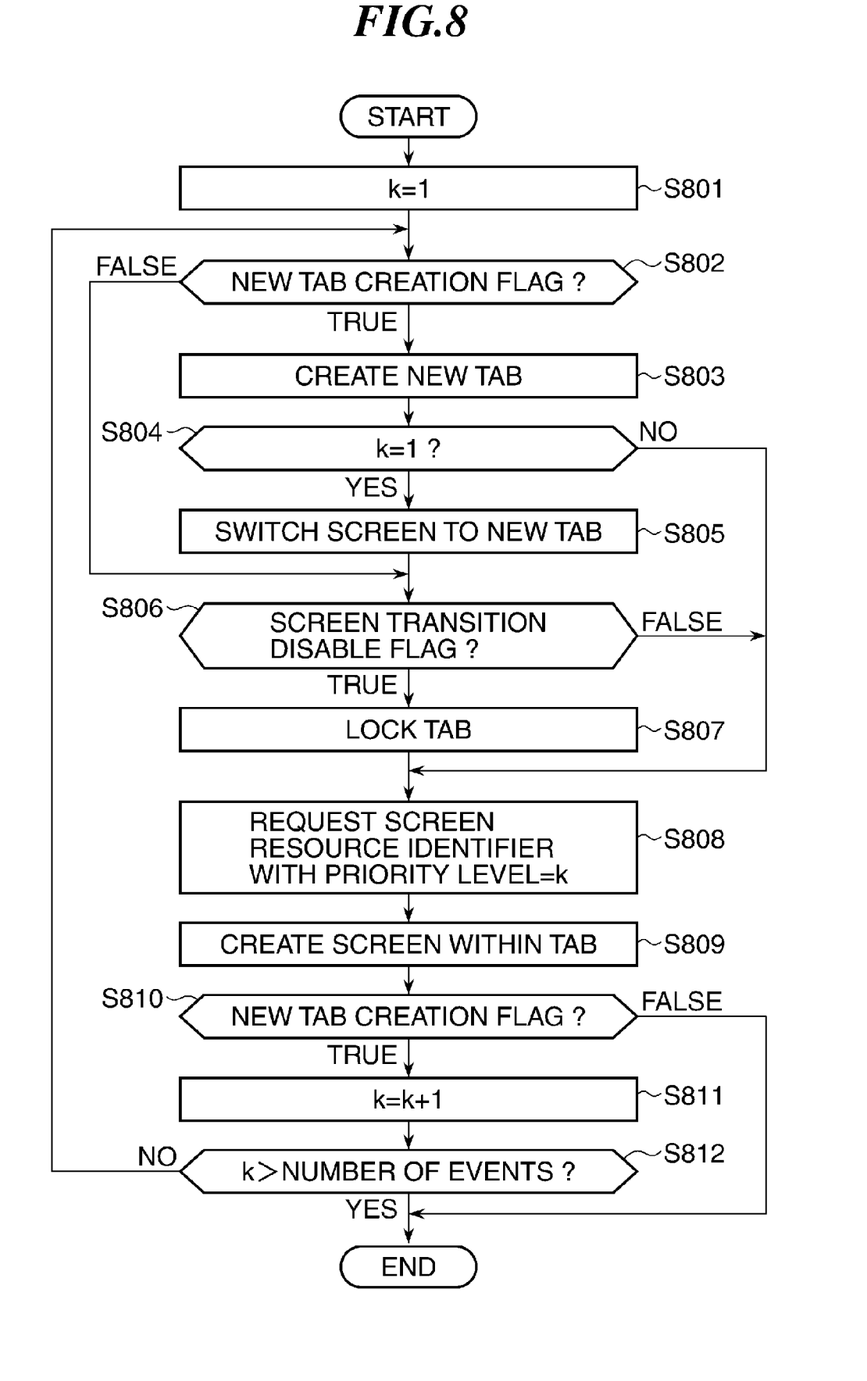
FIG. 8 is a flowchart useful in explaining an exemplary operation carried out when a browser receives a command transmitted from the apparatus status management unit.

FIG. 8 is a flowchart useful in explaining an exemplary operation carried out when the browser 401 receives the command transmitted from the apparatus status management unit 404. Processes in FIG. 8 are carried out by the CPU 210 executing control programs stored in the ROM 211 and the HDD 209 of the MFP 101 and loaded into the RAM 212.

In step S801, the CPU 210 initializes a variable k for retrieving a resource identifier corresponding to a priority level from the command 500 (k=1), and proceeds to step S802.

In the step S802, the CPU 210 determines a value of the new tab creation Flag 502. When True, the CPU 210 proceeds to step S803, and when False, the CPU 210 proceeds to step S806.

In the step S803, the CPU 210 causes the display control unit 402 of the browser 401 to generate a new tab screen, stores tab information displayed on the operation display unit 202 until just before that as management information in the RAM 212, and proceeds to step S804.

In the step S804, when a plurality of error statuses are detected, the CPU 210 determines whether or not the present screen is a screen with the highest priority level, that is, a priority level k=1, and when the present screen is the screen with the priority level k=1, the CPU 210 proceeds to step S805, and when the present screen is not the screen with the priority level k=1, the CPU 210 proceeds to step S808. In the present embodiment, a screen with the highest priority level is displayed first on the operation display unit 202, and screens with lower priority levels are processed in the background.

In the step S805, the CPU 210 causes the display control unit 402 to switch the screen of the operation display unit 202 to a new tab screen, and proceeds to step S806. Specifically, as shown in FIG. 12, for example, the CPU 210 changes the display screen of the operation display unit 202 from a pre-error screen 1201 to a post-error screen 1203.

Figure 12:
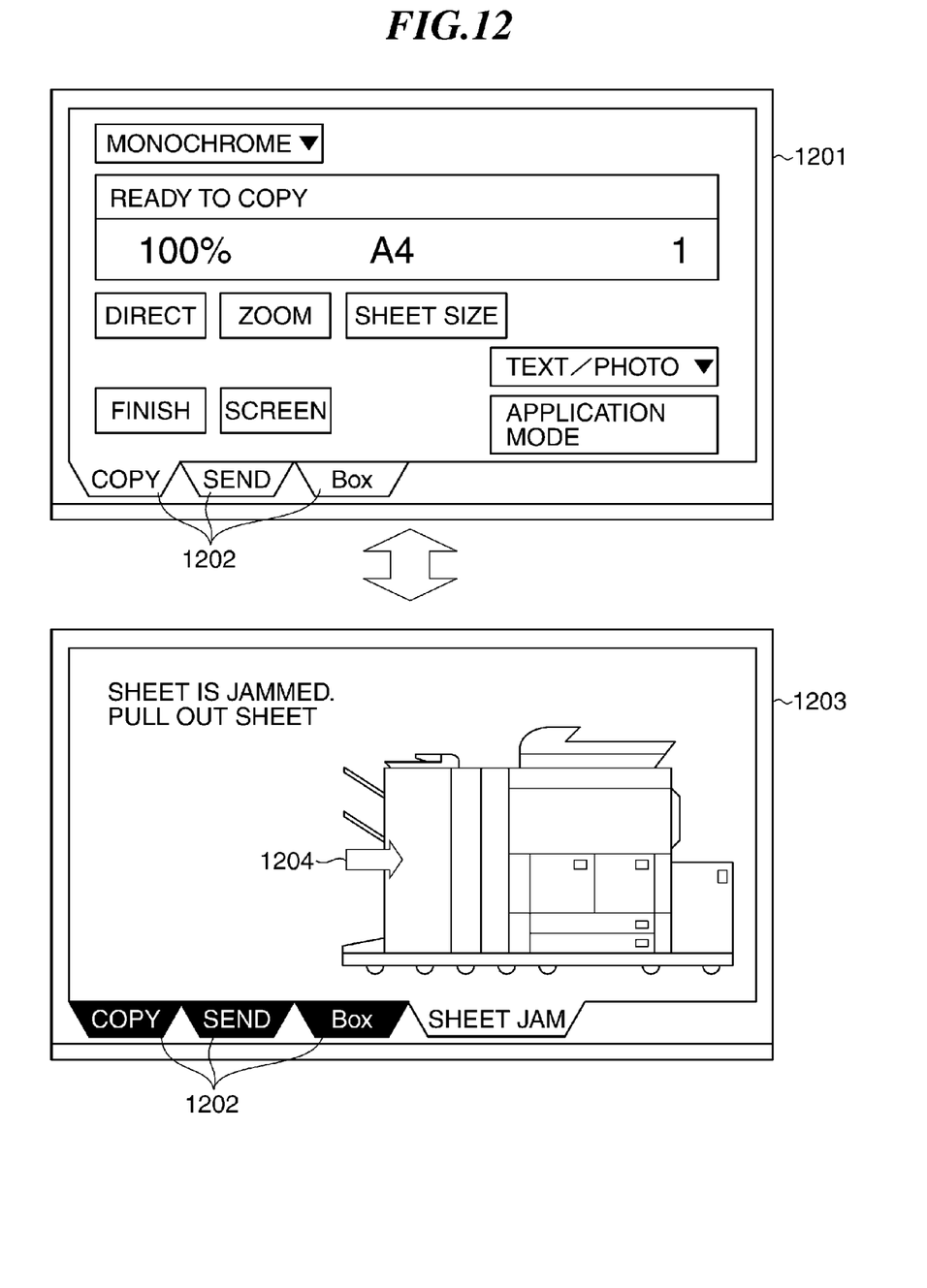
FIG. 12 is a diagram showing examples of a pre-error screen and a post-error screen.

Here, on the pre-error screen 1201 in FIG. 12, settings are configured by manipulating on-screen buttons. Function switching tabs 1202 are tabs for switching between different functional screens, and under normal conditions, the tabs can be switched at any times.

When an error occurs in this state, the post-error screen 1203 is displayed. The post-error screen 1203 indicates that a sheet jam has occurred, and information on a sheet jam position 1204 or the like informs the user of a concrete error position. This can correctly and reliably inform the user of the details of the error and the way to recover from the error.

In the step S806, the CPU 210 determines a value of the screen transition disable Flag 503 of the command 500. When True, the CPU 210 proceeds to step S807, and when False, the CPU 210 proceeds to the step S808.

In the step S807, the CPU 210 causes the display control unit 402 to lock a tab displayed on the operation display unit 202, disables transition to another tab screen, and proceeds to the step S808. Specifically, the CPU 210 highlights the function switching tab 1202 appearing in FIG. 12 to disable selection of the same.

In the step S808, the CPU 210 obtains a resource identifier 506 with a priority level=k from the command 500, issues a request to the server 103 via the request processing unit 403, and proceeds to step S809.

In the step S809, the CPU 210 creates a screen based on screen information transmitted from the server 103 in response to the request in the step S808. Specifically, the CPU 210 creates a screen 1203 after the occurrence of an error appearing in FIG. 12. Also, the CPU 210 holds priority level information that identifies a tab displayed on the operation display unit 202 and an image displayed in the tab, that is, the value of k, as well as screen transition disable Flag information as management information in the RAM 212, and proceeds to step S810.

In the step S810, the CPU 210 determines a value of the new tab creation Flag 502 in the command 500. When the value of the new tab creation Flag 502 is True, the CPU 210 proceeds to step S811. When the value of the new tab creation Flag 502 is False, that is, when a new tab is not to be created, the CPU 210 skips the processes in the steps S811 and S812 and terminates the process because only the screen with the priority level=1 is displayed on the operation display unit 202.

In the step S811, the CPU 210 increments the variable k (k=k+1) to process a screen with the next priority level, and proceeds to step S812.

In the step S812, the CPU 210 determines whether or not the variable k incremented in the step S811 is greater than the number of events 504 in the command 500. When the variable k is greater than the number of events 504, the CPU 210 determines that processing on all display information has been completed, and when not, the CPU 210 returns to the step S802 so as to create another error status screen.

Figure 9:
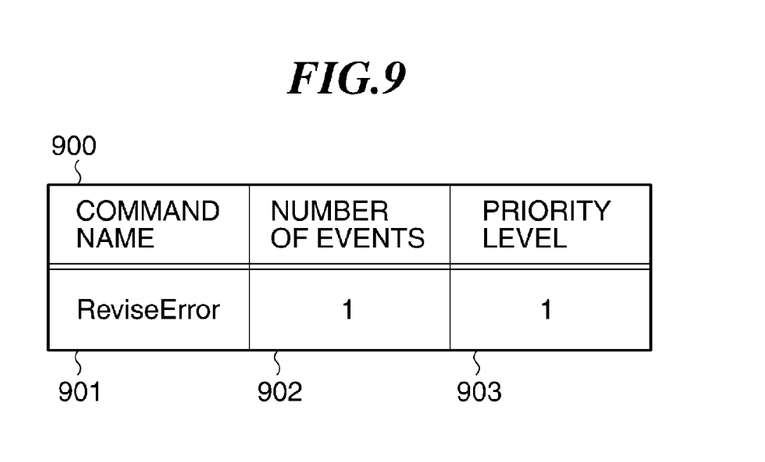
FIG. 9 is a diagram showing an exemplary error recovery notification command sent from the apparatus status management unit to the browser via the I/F.

FIG. 9 is a diagram showing an exemplary error recovery notification command sent from the apparatus status management unit 404 to the browser 401 via the I/F 407.

Referring to FIG. 9, a command name 901 is information that uniquely identifies a command itself, and in the present embodiment, a command name that indicates recovery from an error is stored. It should be noted that when the command 900 is realized by API, a command name is in the same in meaning to an API name.

The number of events 902 is an information field indicative of the number of error events corrected by the command 900.

A priority level 903 is information that identifies a corrected error, and there are the same number of fields of the priority level 505 as the number of events 902.

Figure 10:
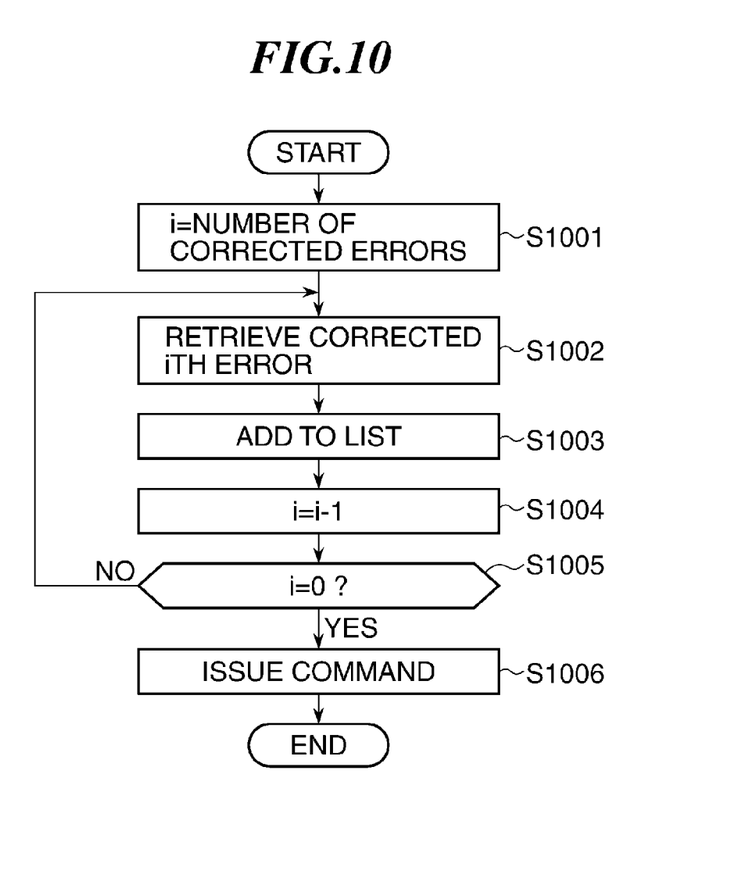
FIG. 10 is a flowchart useful in explaining an exemplary operation carried out when the apparatus status management unit detects an error recovery in the MFP.

FIG. 10 is a flowchart useful in explaining an exemplary operation carried out when the apparatus status management unit 404 detects error recovery in the MFP 101. Processes in FIG. 10 are carried out by the CPU 210 executing control programs stored in the ROM 211 and the HDD 209 of the MFP 101 and loaded into the RAM 212.

In step S1001, the CPU 210 initializes a variable i so as to create the command 900 from error recovery information given to the apparatus status monitoring unit 405.

In step S1002, based on the error recovery information supplied to the apparatus status monitoring unit 405, the CPU 210 retrieves a status relating to the corrected ith error from the management information stored in the RAM 212 or the like in the step S707, and proceeds to step S1003.

In the step S1003, the CPU 210 adds a priority level corresponding to the error status retrieved in the step S1002 to the priority level list 903 in the command 900. Also, the CPU 210 deletes information on the error from the management information stored in the RAM 212 or the like in the step S707, and proceeds to step S1004.

In the step S1004, the CPU 210 decrements the variable i (i=i−1) so as to retrieve a status relating to the next error from the error recovery information given to the apparatus status monitoring unit 405, and proceeds to step S1005.

In the step S1005, the CPU 210 determines whether or not the variable i decremented in the step S1004 is 0, that is, whether or not retrieval of all the error statuses has been completed. When retrieval of all the error statuses has been completed, the CPU 210 proceeds to step S1006, and when retrieval of all the error statuses has not been completed, the CPU 210 returns to the step S1002 and carries out retrieval again.

In the step S1006, the CPU 210 transmits the command 900 in FIG. 9 from the apparatus status management unit 404 to the browser 401 via the I/F 407, and terminates the process.

Figure 11:
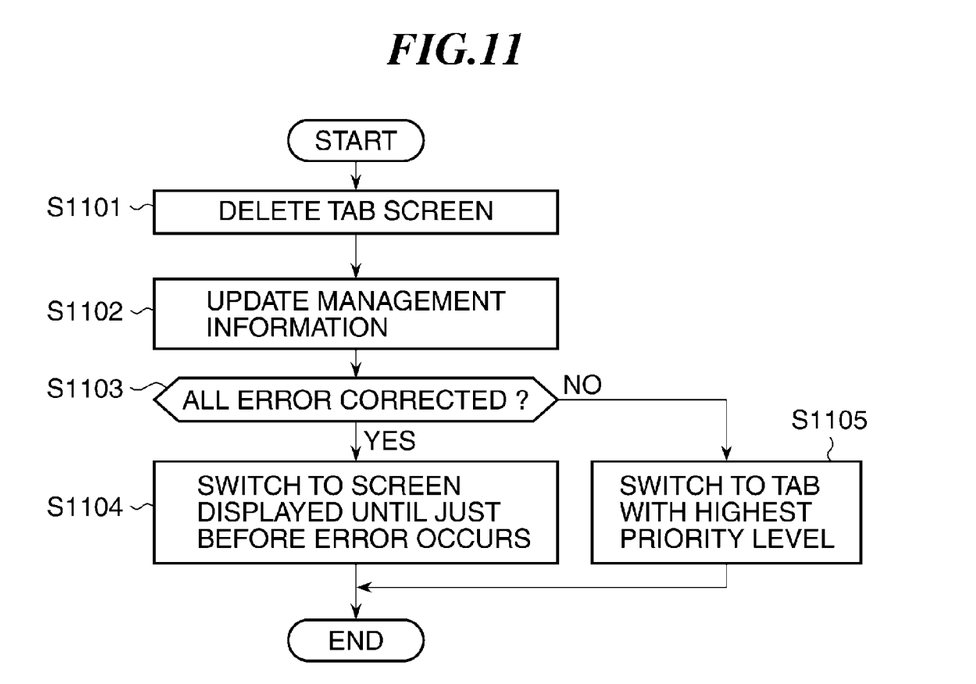
FIG. 11 is a flowchart useful in explaining an exemplary operation carried out when the browser receives a command transmitted from the apparatus status management unit.

FIG. 11 is a flowchart useful in explaining an exemplary operation carried out when the browser 401 receives the command 900 transmitted from the apparatus status management unit 404. Processes in FIG. 11 are carried out by the CPU 210 executing control programs stored in the ROM 211 and the HDD 209 of the MFP 101 and loaded into the RAM 212.

In step S1101, the CPU 210 deletes a tab screen corresponding to a priority level designated by the priority level 903 in the command 900 from the management information stored in the RAM 212 or the like in the step S707, and proceeds to step S1102. Specifically, the CPU 210 deletes a post-error tab screen 1203 shown in FIG. 12.

In the step S1102, the CPU 210 deletes the information relating to the tab deleted in the step S1102 from the management information stored in the RAM 212 or the like in the step S707, updates the management information stored in the RAM 212 or the like in the step S707, and proceeds to step S1103.

In the step S1103, the CPU 210 determines whether or not, as a result of the step S1102, all the errors have been corrected. When all the errors have been corrected, the CPU 210 proceeds to step S1104, and when all the errors have not been corrected, the CPU 210 proceeds to step S1105.

In the step S1104, the CPU 210 causes the display control unit 402 to switch the screen of the operation display unit 202 to a tab screen stored in the RAM 212 in the step S803 in FIG. 8 (a screen displayed until just before the occurrence of an error), and terminates the process. Specifically, the CPU 210 switches from the post-error screen 1203 in FIG. 12 to the pre-error screen 1201 in FIG. 12.

In the step S1105, the CPU 210 retrieves a tab screen with the highest priority level from the management information updated in the step S1102, causes the display control unit 402 to display the retrieved tab screen on the operation display unit 202, and terminates the process.

As described above, in the present embodiment, when an error occurs during operation on the pre-error screen 1201, the display is switched to the post-error screen 1203, and selection of the function switching tab 1202 is disabled. When the error is corrected while the post-error screen 1203 is being displayed, a sheet jam tab is deleted, and the pre-error screen 1201 is displayed again.

Thus, even when an error occurs during operation by a user, and browser screens are forcefully changed, operation can be continued through a browser screen displayed until just before the change of the browser screens when the error is corrected.

Other Embodiments

Aspects of the present invention can also be realized by a computer of a system or apparatus (or devices such as a CPU or MPU) that reads out and executes a program recorded on a memory device to perform functions of the above-described embodiment(s), and by a method, the steps of which are performed by a computer of a system or apparatus by, for example, reading out and executing a program recorded on a memory device to perform functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-212380 filed Sep. 22, 2010, which is hereby incorporated by reference herein in its entirety.

What is claimed is:

1. An image processing apparatus that displays a screen, which is provided by a server, on a display unit using a browser, comprising:
   a detection unit configured to detect a status of the image processing apparatus;
   a creation unit configured to create a screen according to the status detected by said detection unit; and
   a display control unit configured to, when the image processing apparatus changes in status, display the screen created by said creation unit as a new tab; wherein
   when said detection unit detects a plurality of statuses, priority levels are set for the respective statuses, and
   according to the priority levels, said display control unit switches from a screen displayed on said display unit to a screen created by said creation unit.

2. An image processing apparatus according to claim 1, wherein when the image processing apparatus is restored, said display control unit displays, in place of the screen displayed as the new tab, a screen displayed until just before the screen displayed as the new tab is displayed.

3. An image processing apparatus according to claim 1, wherein details of the status and a way to recover from the status are displayed on the screen created by said creation unit.

4. An image processing apparatus according to claim 1, wherein the status is an error status, and recovery from the status is error recovery.

5. An image processing apparatus according to claim 1, wherein information of the screen created by said creation unit is provided by the server.

6. A control method for an image processing apparatus that displays a screen, which is provided by a server, on a display unit using a browser, comprising:
   a detection step of detecting a status of the image processing apparatus;
   a creation step of creating a screen according to the status detected in said detection step; and
   a display control step of, when the image processing apparatus changes in status, displaying the screen created in said creation step as a new tab, wherein
   when said detection step detects a plurality of statuses, priority levels are set for the respective statuses, and
   according to the priority levels, said display control step switches from a screen displayed on said display unit to a screen created by said creation step.

7. A computer-readable non-transitory storage medium storing a control program for implementing a control method for an image processing apparatus that displays a screen, which is provided by a server, on a display unit using a browser, the method comprising:
   a detection step of detecting a status of the image processing apparatus;
   a creation step of creating a screen according to the status detected in the detection step; and
   a display control step of, when the image processing apparatus changes in status, displaying the screen created in the creation step as a new tab, wherein
   when said detection step detects a plurality of statuses, priority levels are set for the respective statuses, and
   according to the priority levels, said display control step switches from a screen displayed on said display unit to a screen created by said creation step.

* * * * *